United States Patent [19]

Jacobsen

[11] 4,368,628

[45] Jan. 18, 1983

[54] APPARATUS FOR TREATMENT OF SUSPENSIONS IN MOVEMENT

[75] Inventor: Finn Jacobsen, Karlstad, Sweden

[73] Assignee: Kamyr AB, Karlstad, Sweden

[21] Appl. No.: 223,741

[22] Filed: Jan. 9, 1981

[30] Foreign Application Priority Data

Jan. 10, 1980 [SE] Sweden ................................ 8000196
Jan. 10, 1980 [SE] Sweden ................................ 8000198

[51] Int. Cl.³ .............................................. D21D 5/02
[52] U.S. Cl. ................................... 68/181 R; 210/388
[58] Field of Search ........................... 68/18 F, 181 R; 162/251, 280; 210/314, 315, 323.2, 388, 391, 413

[56] References Cited

U.S. PATENT DOCUMENTS

| | | | |
|---|---|---|---|
| 3,475,271 | 10/1969 | Laakso | 162/251 X |
| 3,557,583 | 1/1971 | Rich et al. | 68/181 R |
| 3,563,891 | 2/1971 | Richter | 210/315 |
| 3,704,603 | 12/1972 | Richter | 68/18 F |
| 4,029,579 | 6/1977 | Jacobsen et al. | 210/388 X |
| 4,041,560 | 8/1977 | Jacobsen | 210/388 X |
| 4,088,579 | 5/1978 | Kocsanyi et al. | 210/82 |

FOREIGN PATENT DOCUMENTS

1091535 7/1979 Fed. Rep. of Germany .

Primary Examiner—Philip R. Coe
Attorney, Agent, or Firm—Cushman, Darby & Cushman

[57] ABSTRACT

An apparatus and method are provided for treating flowing suspensions, extracting liquid from the suspensions and, if desired, introducing a treatment liquid into the flowing suspensions. Suspension flows in an elongated container from an inlet to an outlet in a first direction, and a screen surface is mounted within the container for screening a portion of the liquid from the suspension. The screen body is elongated in the direction of elongation of the container and defines a screen cavity volume within it, the volume tapering inwardly in the first direction. A baffle is disposed within the screen cavity volume. During movement of the screen in a second direction, opposite the first direction, at a higher speed, backflushing of the screen takes place, substantially evenly over the whole of the screen surface. Displacement liquid is introduced into the container, at at least one level along the inward taper of the screen body, so that during liquid extraction a crosswise displacement with treatment liquid is obtained through substantially all suspension flowing through the container. The container preferably has a vertical orientation, the inlet disposed above the outlet.

20 Claims, 8 Drawing Figures

APPARATUS FOR TREATMENT OF SUSPENSIONS IN MOVEMENT

BACKGROUND AND SUMMARY OF THE INVENTION

The invention relates to an apparatus for treating a flowing suspension. Liquid is continuously extracted from the flowing suspension; if the extraction is combined with the introduction of a treatment liquid, then treatment of the suspension occurs, while if the extraction is not accompanied by an introduction of treatment liquid, dewatering of the suspension occurs.

When used for dewatering, the apparatus according to the present invention is of the same general type as the dewatering apparatus shown in U.S. Pat. No. 4,041,560 (the disclosure of which is hereby incorporated by reference herein) wherein a screen body is reciprocated in a direction generally parallel to a suspension flow, with backflushing of the screen openings taking place during movement of the screen opposite to the direction of movement of the suspension. While prior art systems such as disclosed in U.S. Pat. No. 4,041,560 are generally successful in accomplishing their desired result, there are several areas where improvement is possible. The apparatus according to the present invention is advantageous compared to such prior art assemblies in that the backflushing takes place substantially evenly over the whole of the screen surface. The apparatus according to the present invention is also advantageous over prior art systems in that it facilitates the introduction of a treatment liquid into the flowing suspension, the treatment liquid introduction being practiced so that during liquid extraction with the screen body a crosswise flow of treatment liquid is obtained through substantially all suspension flowing through the container. This makes the apparatus according to the present invention extremely versatile for performing a variety of treatment functions.

The apparatus according to the present invention may be used for dewatering or treating a wide variety of suspensions, but are particularly useful for dewatering and treating comminuted cellulosic fiber material suspended in liquid, which liquid can either be water or a chemical treatment liquid, such suspensions commonly being used and produced during the production of paper products.

According to one aspect of the present invention, apparatus for continually extracting liquid from a flowing suspension is provided. The apparatus includes an elongated container through which suspension to be treated flows in a first direction, an inlet and an outlet being provided adjacent opposite ends of the container in a dimension of elongation thereof. Screen means are provided for removal of a portion of the liquid from the suspension flowing through the container, and extending generally in the direction of elongation of the container. The screen means include a perforated screen surface defining a screen cavity volume therewithin. An outlet from the screen cavity volume is connected to an area remote from the container, and bearing means mount the screen means for movement generally in the dimension of elongation of the container, and means are provided for moving the screen means in the dimension of elongation of the container, both in the first direction and in a second direction opposite the first direction. Baffle means are disposed within the screen cavity volume for cooperating with the screen surface so that backflushing of the screen surface takes place during movement thereof in the second direction, the backflushing being substantially even over the whole of the screen surface.

According to another aspect of the apparatus according to the present invention, the screen means includes a screen surface defining a screen cavity volume therewithin, the cavity volume tapering inwardly in the first direction so that it has a larger cross-sectional area at the points closer to the container inlet than at points closer to the container outlet. According to both described aspects of the present invention, preferably the screen surface tapers inwardly so that it is spaced farther from the container interior sidewalls at points closer to the container outlet than it is at points closer to the container inlet.

The container preferably is substantially circular in cross-section, having a substantially constant diameter along the dimension of elongation thereof, and treatment liquid introduction is provided by annular baffle plates disposed at at least one position along the inward taper of the screen body at the container interior sidewall. The screen moving means preferably moves the screen means at a first speed comparable to the speed of flow of suspension in the first direction, and at a second speed, much greater than the first speed, in the second direction. Withdrawal of suspension from the container outlet may be facilitated by a rotating scraper.

According to an exemplary method of using the apparatus of the present invention, treatment of the suspension flowing through a container in a first direction is provided. The method comprises the following steps: Introducing suspension under a motive force into the container inlet and withdrawing it from the container outlet so that it flows in the first direction within the container. Effecting movement of the screen body in the first and second directions within the container to extract some of the liquid from the moving suspension within the container so that it flows into the volume defined by the screen body. Withdrawing liquid passing into the volume defined by the screen body from that volume to an area remote from the container; and introducing treatment liquid into the container, from an interior sidewall of the container, at at least one position along the inward taper of the screen body, so that during liquid extraction with the screen body a crosswise flow of treatment liquid is obtained through substantially all suspension flowing through the container.

The introduction of treatment liquid may be practiced utilizing an annular baffle plate provided at an interior sidewall of the container, the treatment liquid being introduced so that the liquid initially has a velocity component in the first direction and is introduced substantially evenly around the circumference of the container. Alternatively, or additionally, treatment liquid introduction pipes may be disposed at various points within the container, this being especially useful where a plurality of screen surfaces are provided, or the suspension flows both centrally and exteriorly of an annular screen surface.

It is the primary object of the present invention to provide an apparatus for continuously extracting liquid from a flowing suspension with substantially even backflushing of a screen surface thereof, and for providing the effective introduction of treatment liquid into a flowing suspension in such a device. This and other objects of the invention will become clear from an in-

DETAILED DESCRIPTION OF THE DRAWINGS

The drawings illustrate a wide variety of configurations that the apparatus according to the present invention may take, each of which is capable of practicing a method of treating a flowing suspension by extracting liquid therefrom and introducing treatment liquid thereinto. In each embodiment, comparable structures are referred to by comparable reference numerals, except that the numeral is preceded by a different number for each embodiment. For instance, in the embodiment of FIG. 1, the container through which suspension to be treated flows is indicated by reference numeral 10, while in the FIG. 2 embodiment it is illustrated by reference numeral 110, in the FIG. 3 embodiment by reference numeral 210, etc. The general concept of the present invention will now be described with respect to FIG. 1, and then the particular characteristics of each further embodiment will be described.

Figure 1:
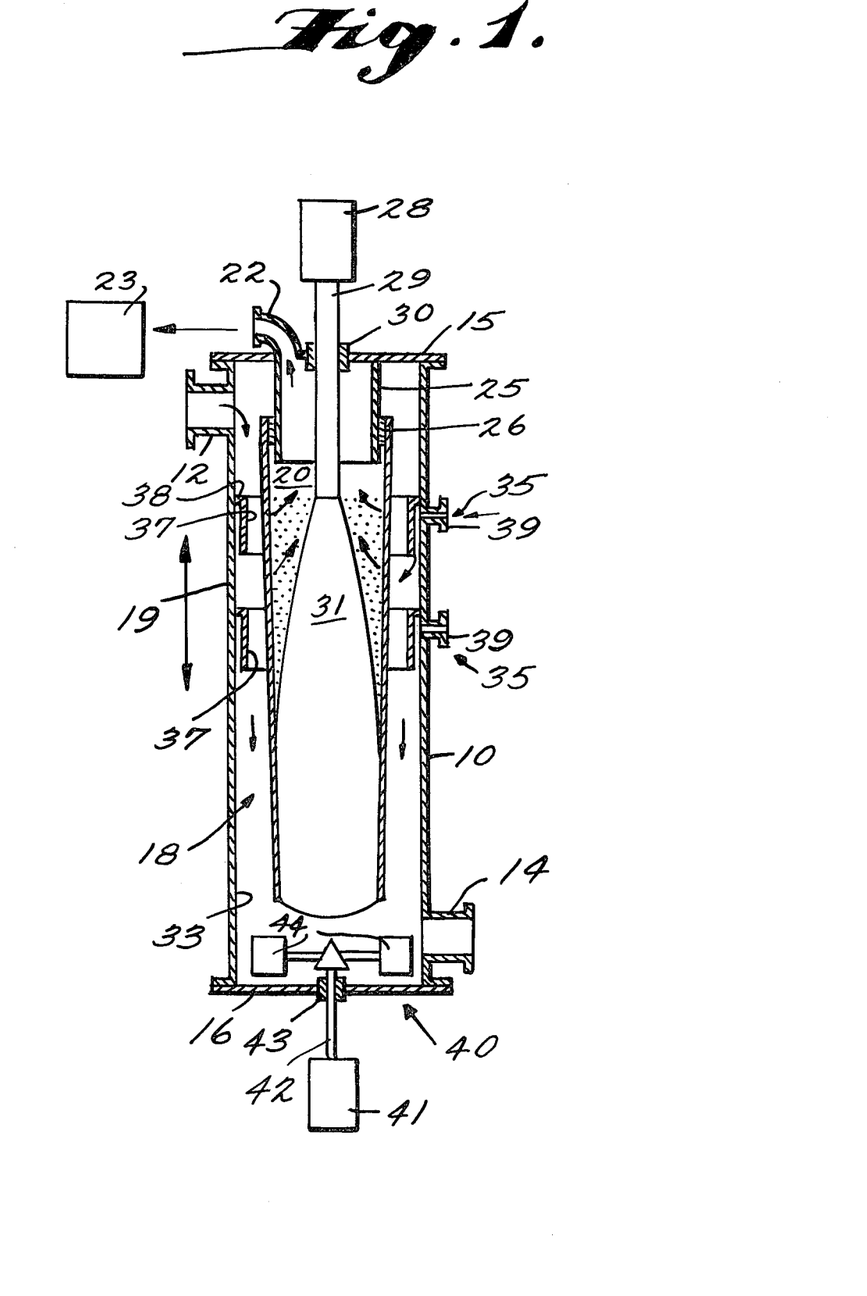
FIGS. 1 through 5 are longitudinal cross-sectional views of various embodiments of exemplary apparatus according to the present invention, portions of the embodiments in FIGS. 2 and 3 being cut away for clarity.

The apparatus according to the present invention includes an elongated container 10, which, as illustrated in FIG. 1, preferably is circular in cross-section and has a substantially constant diameter in the dimension of elongation AB thereof. An inlet 12 is provided adjacent one end of the container 10, and an outlet 14 adjacent the other end. Suspension flows through inlet 12 in the direction of the arrows, this being a first direction A, and then out the outlet 14. In the FIG. 1 embodiment, sealing covers 15, 16 are provided at the opposite ends of the container 10, and the inlet and outlet 12, 14, are substantially perpendicular to the dimension of elongation AB of the container 10. The suspension to be treated by the apparatus may comprise comminuted cellulosic fibrous material, or the like.

The apparatus illustrated in FIG. 1 further comprises screen means, shown generally at 18, for removal of a portion of the liquid from the suspension flowing through the container 10. The screen means 18 extends generally in the dimension of elongation AB of the container 10, and includes a perforated screen surface 19 which defines a screen cavity volume 20 therewithin. An outlet 22 extends from the screen cavity volume 20 to an area remote from the container, such as reservoir 23. Liquid extracted from the flowing suspension flows, as illustrated by the arrows in FIG. 1, through the screen surface 19 and then flows through the outlet 22, which in the FIG. 1 embodiment extends through the end wall 15.

Bearing means, such as the bearing body 25 and the annular sealing bearing component 26, mount the screen surface 19 for movement in direction A, and in direction B, opposite direction A. As illustrated, the movement is desirably linear. The apparatus further comprises means for moving the screen means 18 in the dimension AB in the first and second directions A, B, respectively. Such moving means preferably comprises a fluid cylinder (pneumatic or hydraulic) 28 or like drive device. The drive device 28 is operatively connected to the screen surface 19 by any desirable means. In the FIG. 1 embodiment, connection between the screen surface 19 and the drive device 28 is via a shaft 29 which passes through seal 30 in container end wall 15, and a paraboloid of revolution body 31, which is welded at opposite ends thereof to shaft 29 and screen surface 19.

In the FIG. 1 embodiment, the paraboloid of revolution body 31 comprises baffle means disposed within the screen cavity volume 20 for cooperating with the screen surface 19 so that backflushing of the screen surface 19 takes place during movement thereof in the second direction B. The particular design and operative relationships between the baffle means 31 and screen surface 19 are such that uniform backflushing takes place substantially evenly over the whole of the screen surface 19, rather than—as in some prior art systems—being more concentrated at the ends of the screen surface remote from the extraction liquid outlet.

The screen surface 19 tapers inwardly in the direction A so that it has a larger cross-sectional area at points thereof closer to container inlet 12 than at points closer to container outlet 14. Since the container 10 preferably is of substantially constant cross-sectional area throughout the length thereof, the screen surface 19 will thus be spaced farther from the container interior sidewall(s) 33 at points closer to the container outlet 14 than at points closer to the container inlet 12.

When the apparatus illustrated in FIG. 1 is operated to effect suspension dewatering, preferably the drive device 28 moves the screen means 18 in first direction A at substantially the same speed as the suspension flow, and then moves it at a much greater speed in second direction B. During movement of the screen means 18 in direction A, a differential pressure is provided causing liquid to pass through the screen surface 19 into the cavity volume 20, ultimately to pass through extraction liquid outlet 22 to reservoir 23. During movement of the screen means 18 in direction B backflushing takes place, the liquid being expelled from the cavity volume 20 to flush off suspension particles that may adhere to the screen surface 19, the backflushing being substantially even over the whole of the screen surface 19.

The apparatus of FIG. 1 also is readily utilizable for treatment of the flowing suspension, in addition to being utilizable for dewatering thereof. Treatment liquid introduction means, illustrated generally at 35, are provided for introducing treatment liquid (such as a pulp bleaching liquid, wash liquid, etc.) into the container 10. One, two, or any other number of treatment liquid introduction structures 35 may be provided as required for a particular operation. As illustrated in FIG. 1, the treatment devices 35 are positioned along the container 10 along the inward taper of the screen body 19 so that during liquid extraction with the screen means 18 a crosswise flow of treatment liquid is obtained through substantially all suspension flowing through the container. In the embodiment illustrated in FIG. 1, the treatment liquid introduction means 35 comprises, for each location, a baffle plate 37 spaced a slight distance from the container interior sidewall 33 by an upper annular wall 38, and open adjacent the end thereof most remote from the container inlet 12. Inlet conduit 35 introduces the treatment liquid into the volume between the baffle plate 37 and the interior sidewall 33, the liquid flowing around the entire circumference of the sidewall 33, and, because of the shape of the baffle 37, initially having a velocity component in the direction A when contacting the suspension flowing through the container 10. Such an arrangement, combined with the even extraction and backflushing of the screen surface 19, effects a uniform treatment of the suspension while flowing from inlet 12 to outlet 14.

In order to facilitate discharge of the suspension through the outlet 14, a rotating scraper, illustrated generally at 40, may be provided. The scraper includes drive device 41, rotatable shaft 42 mounted through seal 43 in end wall 16, and scraper blades 44.

The apparatus of FIG. 1 may be operated in a number of orientations, depending upon particular end-use. However, it is especially advantageous to arrange the container 10 so that the dimension of elongation AB thereof is vertical, with the inlet 12 being disposed above the outlet 14. In this way, the best conditions for even suspension flow and treatment are obtained since the friction force due to contact between the screen surface 19 and the suspension, and the weight of the moving parts, act in the direction of gravity as the screen surface 19 is being moved in direction A. Therefore, very little force and power is necessary. When moved in the opposite direction B, a relatively high power input is required to initiate the movement, but after a short distance the backflushing through the screen holes decreases the friction between the screen surface 19 and the suspension so that relative movement therebetween is facilitated. Gravity then acts advantageously in terminating movement of the screen means 18 in dimension B, the movement termination being smooth and without any significant shock.

The screen surface 19 may be constructed from a wide variety of materials. For instance, it may comprise a rough-perforated sub-skirt which is coated with woven steel cloth, nylon cloth, or the like. The surface 19 may be conical or wedge-shaped with a smooth taper, or it may be formed in a stair-step arrangement, being formed by cylinders of smaller and smaller diameters, with screen slots formed at the joints between the cylinders so that the screen slots are located in the shadow of the suspension movement over the screen "stairs." The screen openings or slots may be circular, elongated, or any other configuration depending upon the particular design and the suspension to be treated.

Figure 2:
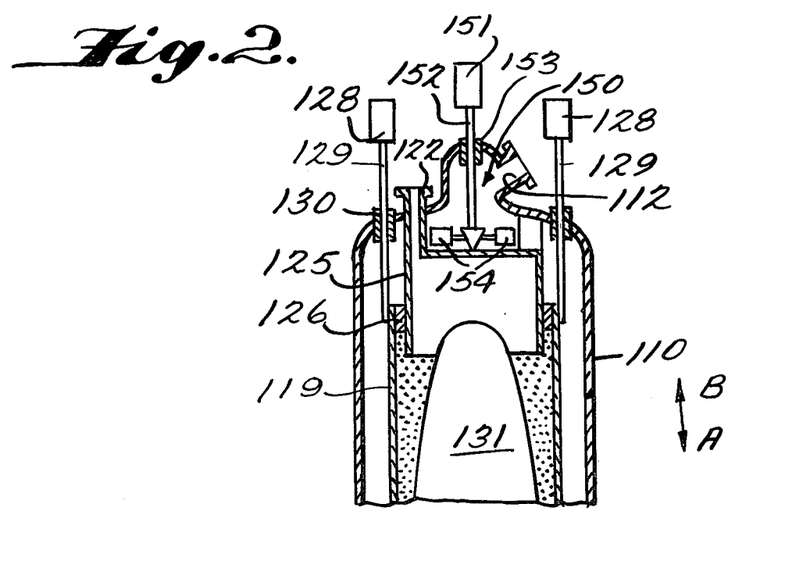

In the embodiment illustrated in FIG. 2, the suspension inlet 112 is disposed at a raised portion of the container 110, and at the inlet a rotating scraper, illustrated generally at 150, is provided. The scraper 150, like the scraper 40 illustrated in FIG. 1, includes a conventional drive 151, rotatable shaft 152 passing through seal 153, and scraper blades 154, and provides for even introduction of the suspension into the container 110. Also in this embodiment, a plurality of linear drives 128 are provided for effecting movement in dimension AB of the screen body 119, the reciprocating shafts 129 being directly connected to the screen body 119, and the interior paraboloid of revolution body 131 being connected at the bottom end thereof to the screen surface 119, but not being connected at the top thereof.

Figure 3:
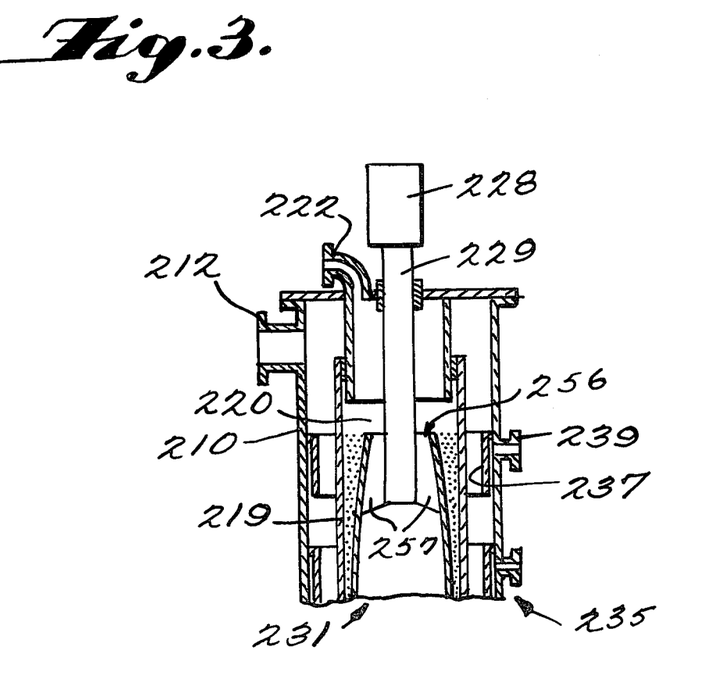

In the embodiment illustrated in FIG. 3, the baffle means 231 has a different design. In this design, the paraboloid of revolution interior body has an open end 256 adjacent the point of connection of the reciprocating rod 229, the rod 229 being connected to the baffle body by spider arms 257. In this embodiment, since the open end 256 is provided the baffle body 231 will fill with extraction liquid, the movement of the screen surface 219 thereby also resulting in movement of the liquid enclosed within the baffle body 231, the total mass to be accelerated thus being larger. With this arrangement, however, the design of the baffle means 231 can be somewhat simpler, particularly for the treatment of suspensions under high pressure.

Figure 4:
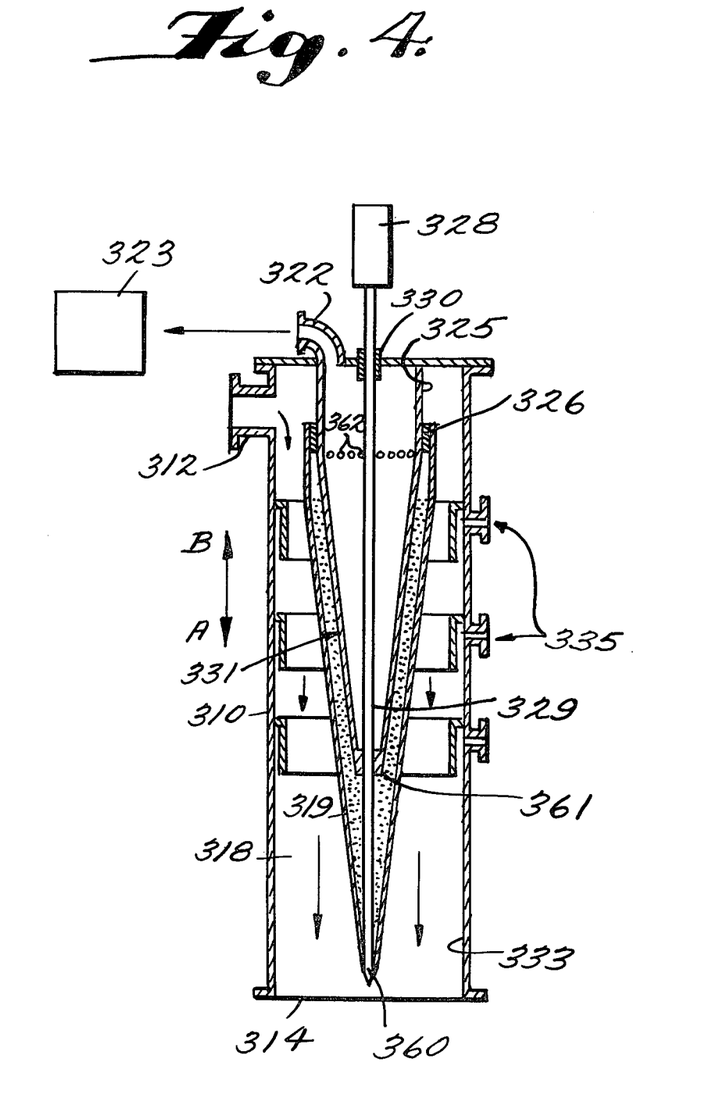

In the FIG. 4 embodiment, the suspension outlet 314 is formed as the end of the cylindrical container 310. The reciprocating rod 329 is connected directly at end 360 thereof to the screen surface 319. However, in this embodiment a stationary baffle means 331 is provided having a conical exterior corresponding generally in taper to the taper of the screen surface 319. Thus, during first upstroke of the screen 318, the spacing between screen surface 319 and the stationary baffle means 331 will be instantly reduced. This creates a small relative pressure increase of the filtrate liquor trapped between the two surfaces. Part of that filtrate must therefore pass (return) through the screen surface perforations and form a liquor film between the outside of the screen surface and the pulp suspension.

The combined effect of the conical shape of the screen means and the stationary baffle conforming in shape with same ensures absolutely uniform backflush effect and thus creates a liquor film of uniform thickness all over the screen surface on the pulp suspension side of the screen during the fast (return) upstroke.

Slide bearing means 361 is provided at the end of the conical baffle means 331 to allow the reciprocating rod 329 to move with respect thereto. Extraction liquid flows from the screen surface 319 to the extraction liquid 322 through holes 362.

Figure 5:
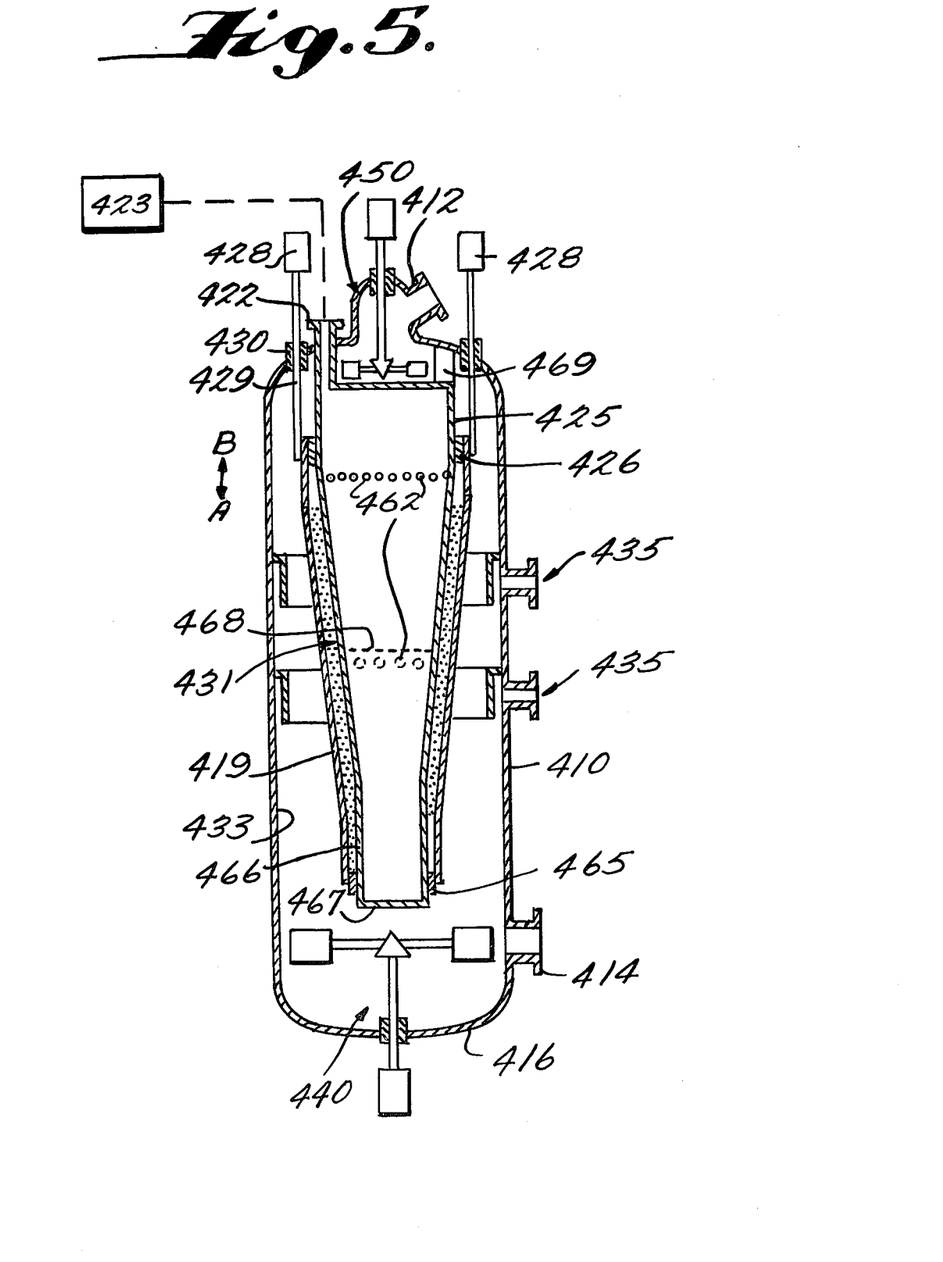

In the embodiment of FIG. 5, the suspension inlet, drive devices 428, etc., are identical to those illustrated in the FIG. 2 embodiment. The purpose of the stationary baffle means 431 is identical to that of FIG. 4. In the FIG. 5 embodiment, the stationary baffle means thus conforms in shape and conicity with the screen surface 419. However, in this embodiment, the cylindrical prolongation 466 of the baffle means protrudes the screen means at the bottom of the screen surface 419. In this embodiment, also, slide bearings 465 are provided at the bottom end of the screen surface 419, cooperating with lower cylindrical extension 466 of baffle means 431, the cylindrical extension 466 being closed off by lid 467. If desired, a partition wall, shown in dotted line at 468 in FIG. 5, may divide the interior of the baffle means 431 into two cavities. The liquid extracted below the partition wall 468 can be removed by a separate structure (such as a pipeline penetrating the container 410 top cover, such pipeline not illustrated in FIG. 5). One form such a withdrawal could take would be an interior pipe extending within the conical baffle means 431 from the chamber below partition 468 up to hollow supporting arm 469, connected to another extraction liquid outlet (not shown). By providing the interior partition 468, one treatment liquid (e.g., bleaching chemical) can be introduced through the top treatment liquid introduction structure 435, while another treatment liquid (e.g., a wash liquid) may be introduced through the bottom treatment liquid inlet 435, with separate extractions.

Of course, the baffle means 431 may be divided into a plurality of other chambers, if desired, and each such chamber may cooperate with a different treatment liquid introduction structure 435. In this way, the suspension may be treated countercurrently, with the extracted liquid from each stage being used as the treatment liquid for the previous stage, with clean wash water being added to the suspension through the bottommost (closest to the outlet 414) treatment liquid introduction structure 435.

Figure 6:
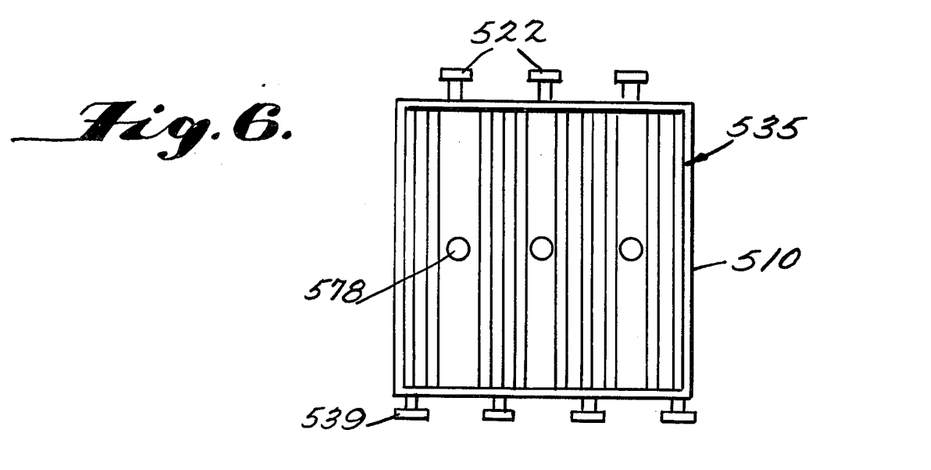
FIG. 6 is a top plan view of another embodiment of the apparatus according to the present invention.
Figure 7:
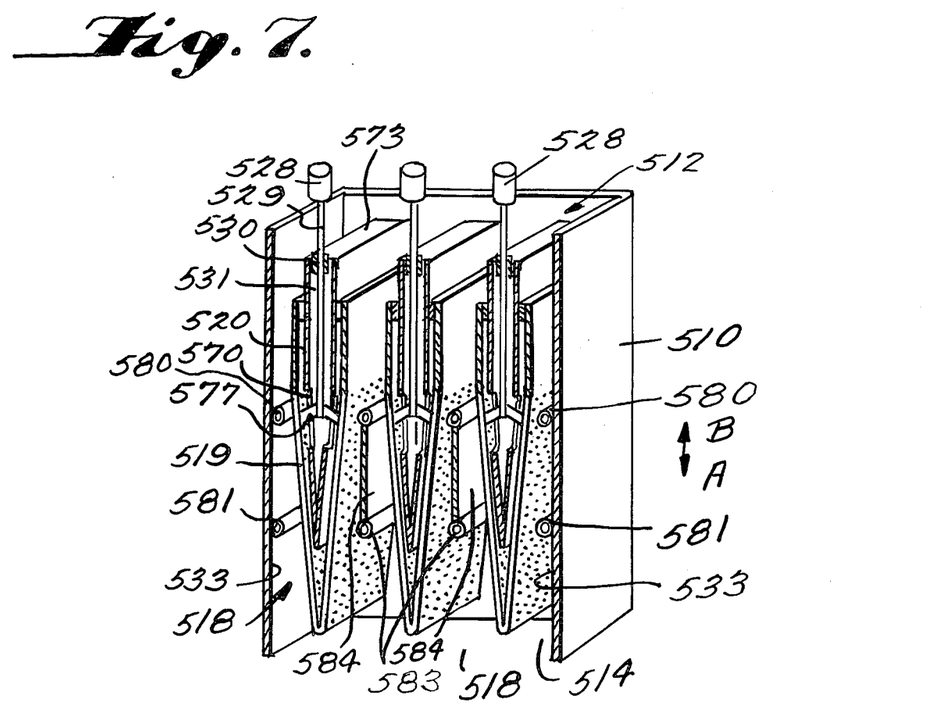
FIG. 7 is an perspective cross-sectional view of the embodiment of FIG. 6.

In the FIGS. 6 and 7 embodiment, the container 510 is shown as a structure that is quadrate in cross-section, having an open top 512 serving as the suspension inlet, and an open bottom 514 serving as the suspension outlet. In this embodiment, a plurality of screen means (e.g., three) 518 are provided, which each may have a separate drive device 528, or may be commonly actuated where desired. Each reciprocating rod 529 may be connected to a screen surface 519 by spider arms 557, which pass through slots 570 (which also provide for extraction liquid passage) formed in the interior baffle means 531. The bearing means 530 for the reciprocating rods 529 are formed in an upper closed wall 573 of baffle means 531. In this embodiment, both the screen surfaces 519 and baffle means 531 are truly wedge-shaped.

In the FIGS. 6 and 7 embodiment, the treatment liquid introduction structures 535 are substasntially different than in the other illustrated embodiments. The treatment liquid introduction structures take the form of a plurality of pipes 580, 581, disposed adjacent the sidewalls 533 of container 510, each pipe having a series of openings formed along the length thereof, and interiorly mounted fluid distribution pipes 582, 583 also may be provided. The interior pipes 582, 583 may be innerconnected by dividing wall portions 584, which serve to divide the flow more evenly between the screen bodies 518. The pipes 580–583 may have any desired configuration in order to provide a minimum of resistance to the suspension flow, while still providing even introduction of treatment liquid. The treatment liquid is actually introduced into the pipes 580 through 583 through the conduits 539 (see FIG. 6).

Figure 8:
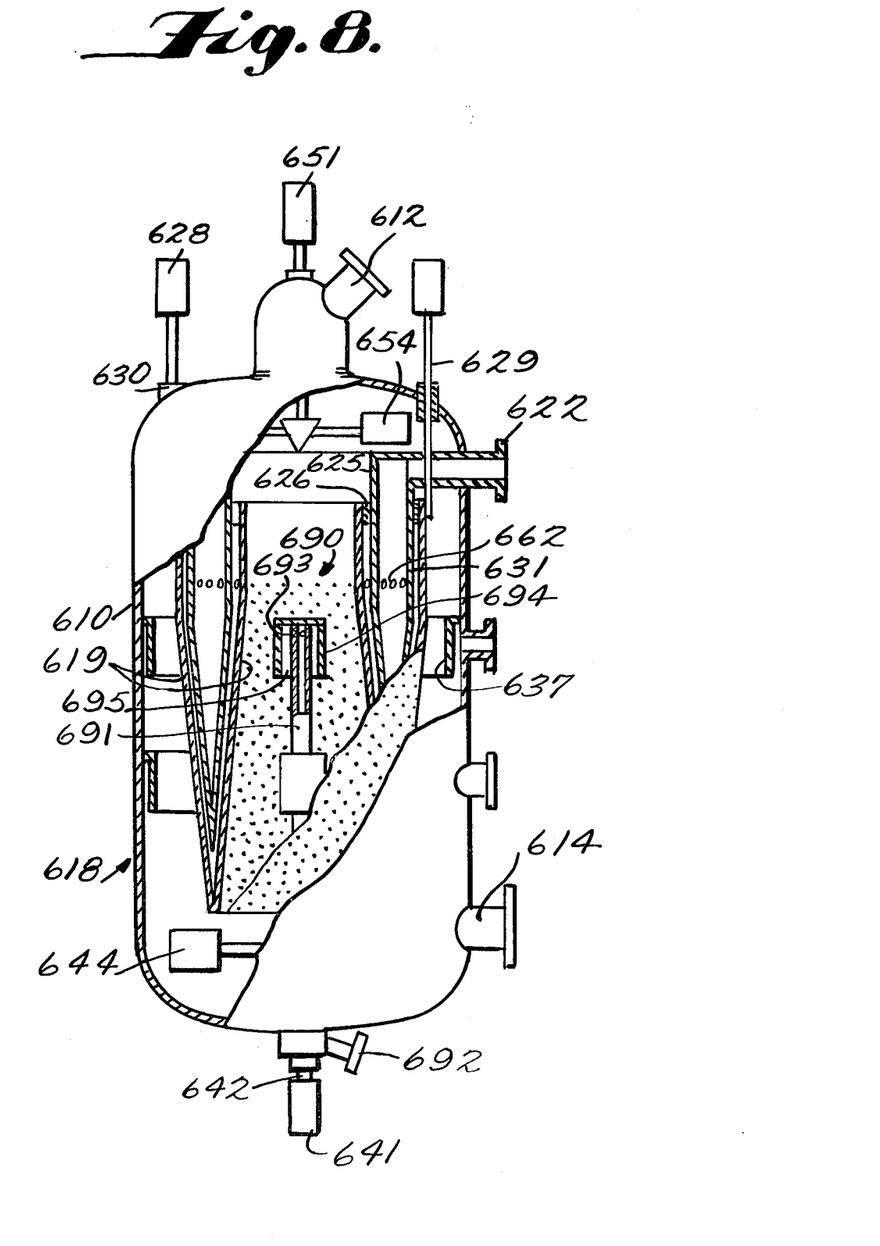
FIG. 8 is a side view, partly in cross-section and partly in elevation, of yet another embodiment of the apparatus according to the present invention.

In the embodiment illustrated in FIG. 8, instead of the screen surface 619 being defined as a right circular cone (or truncated cone), it is defined as a generally toroidal structure, again tapering inwardly in the first direction A. This provides the screen means 618 with an annular cross-section so that suspension flows both inwardly of and exteriorly of the screen surfaces 619. Thus, in this embodiment, the treatment liquid is introduced, in addition to underneath the baffles 637, through the interior liquid introduction structure 690. The interior fluid introduction structure 690 comprises a tubular shaft 691 which commnicates with, and is rotatable with, the shaft 642 for the scraper blades 644, driven by drive 641. Treatment liquid is introduced through conduit 692 to the interior of the pipe 691, and then flows through openings 693 in the top of the conduit 691, between the volume defined by the hat-shaped baffle body 694, out the open bottom 695 of the baffle body 694. In this way, the treatment liquid is also introduced evenly into that portion of the suspension flowing centrally of the screen means 618.

In the FIG. 8 embodiment, it will be seen that the extraction liquid withdrawal conduit 622 penetrates the sidewalls 633 of the container 610, rather than extending through the top wall thereof. This connection also provides for mounting of the baffle means 631, an extension of which forms the bearing mens 625. While one annular screen body has been illustrated in FIG. 8, it will be readily apparent that a plurality of concentric annular screen bodies may be provided within the container 610, with a suitable corresponding number of treatment liquid introduction structures (690 or the like) if suspension treatment is practiced. If a plurality of such annular screen bodies are provided, the distribution thereof should be such that the distance between the treatment liquid supply devices and the closest screen body will be about 0.1 to 0.5 meters in order to obtain the best possible conditions for displacement. About the same condition is generally valid with respect to the thickness of the suspension layer if liquid is not added, and the apparatus is used for thickening only.

Each embodiment according to the present invention will be useful for differing operating and suspension conditions, etc. For instance, the embodiment of FIG. 5 is particularly useful where very little stirring of the suspension is desired, especially if the bearing seals 426, 465 are made with as small a diameter as possible relative to the diameter of the bearing bodies 425, 466. For the embodiments wherein the container (e.g. 10, 610) is circular in cross-section, super-atmospheric pressure conditions may be tolerated very well, and suitable adjustable control devices may be utilized in conjunction with the inlets and outlets maintaining continuous flows thus controlling the dewatering and/or displacement (wash) effects. Furthermore, the screen backflushing conditions may be controlled by a suitable number and dimensioning of openings within the baffle bodies (e.g., openings 462 in the FIG. 5 embodiment) by providing the baffle means with a parabolic or conical shape, as in the FIGS. 1 through 3 embodiments, or by having a stationary baffle means with substantially the same conicity as the screen surface, as in the FIGS. 4 through 8 embodiments. It is possible according to the present invention to provide substantially even backflushing of the screen surface, minimizing the tendency for liquid to collect in the rear of the screen body and thereby clean the rear part to a larger extent than in the front part. Where more than one screen body is provided, the screen bodies may be moved synchronously, or separately, depending upon the particular situation.

An exemplary manner of operation of an apparatus according to the present invention will now be described, with particular reference to FIG. 5, the suspension being sulphate pulp withdrawn from a Kamyr Continuous Digester. For such a structure, the screen body 319 may have a maximum diameter of 750 millimeters, a perforated length of 2.75 meters, with an active screen area of 6 square meters. The inlet and outlet pressure is maintained at 5 atmospheres, with the inlet and outlet pulp concentration being about 9.5% (pulp concentrations of about 8 to 15% being most effectively treated). The inlet pulp temperature is 80° to 85° C., the wash liquid temperature 105° to 110° C., the thickness of the pulp bed about 140 millimeters, and the cone angle about 2°.

The suspension is introduced through inlet 412, and passes as indicated by the arrows in first direction A, moving toward outlet 414. As it flows in the container 410, the cylinder 428 moves the screen surface 419 up and down, sliding on bearing means 425, 426 and 466, 465. During movement in direction A, it moves at substantially the same velocity as the suspension being treated, while in direction B it moves at a significantly greater speed. The length of the stroke in the direction AB is preferably about 20 to 50 centimeters (or a maximum of about 70 centimeters).

As the suspension flows from inlet 412 to outlet 414, liquid therefrom is extracted through the screen surface 419, and flows through openings 462 ultimately to extraction liquid outlet 422 and to reservoir 423. Treatment or displacement liquid, such as washing liquid for sulphate pulp, is introduced at introduction structures 435, being dispersed evenly around the circumference of the container 410, and initially having a downward velocity component, being identical to that of the pulp suspension, effecting crosswise flow of treatment liquid through substantially all the suspension flowing through the container 410.

The washed sulphate pulp withdrawn through the outlet 414 when the method as recited above is practiced is eminently suitable, and is obtained while maintaining a much higher screen loading (while still maintaining a safe function) compared to prior art systems.

It will thus be seen that according to the present invention an improved method and apparatus have been provided for the extraction of liquid from a flowing suspension and/or the treatment of the suspension with a treatment liquid.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for continuously extracting liquid from a flowing suspension, comprising
    an elongated container through which suspension to be treated flows in a first direction substantially coextensive with the dimension of elongation of said container, said container having an inlet and an outlet adjacent opposite ends of said container in the dimension of elongation thereof;
    screen means for removal of a portion of the liquid from the suspension flowing through said container, said screen means including a screen surface defining a screen cavity volume therewithin, the screen cavity volume continuously tapering over substantially the entire operative length thereof in said first direction so that the cross-section of suspension flow channel expands towards said container outlet;
    baffle means disposed within said screen cavity volume;
    an outlet from said screen cavity volume to an area remote from said container;
    bearing means for mounting said screen means for movement generally in the dimension of elongation of said container; and
    means for moving said screen means generally in the dimension of elongation of said container.

2. Apparatus for continuously extracting liquid from a flowing suspension, comprising:
    an elongated container through which suspension to be treated flows in a first direction, an inlet and an outlet being providing adjacent opposite ends of said container in the dimension of elongation thereof;
    screen means for removal of a portion of the liquid from the suspension flowing through said container, and extending generally in the dimension of elongation of said container, said screen means including a perforated screen surface defining a screen cavity volume therewithin;
    an outlet from said screen cavity volume connected to an area remote from said container;
    bearing means mounting said screen means for movement generally in the dimension of elongation of said container;
    means for moving said screen means in the dimension of elongation of said container in said first direction, and in a second direction opposite said first direction, and
    baffle means disposed within said screen cavity volume for cooperating with said screen surface so that backflushing of said screen surface takes place during movement thereof in said second direction, the backflushing being substantially even over the whole of said screen surface, and comprising a generally conically-shaped body tapering inwardly in said first direction, and stationary with respect to said container.

3. Apparatus as recited in claim 2 wherein said screen surface tapers in said first direction so that the cross-section of suspension flow channel expands towards said container outlet.

4. Apparatus as recited in claim 1 wherein said screen surface is spaced farther from said container interior sidewalls at points closer to said container outlet than it is at points closer to said container inlet.

5. Apparatus as recited in claim 3 or 4 wherein said container is substantially circular in cross-section, having a substantially constant diameter along the dimension of elongation thereof.

6. Apparatus as recited in claim 2 wherein said means for moving said screen means comprises means for moving said screen means at a first speed in said first direction, substantially comparable to the speed of flow of the suspension in the first direction, and at a second speed in said second direction, the second speed much greater than the first speed.

7. Apparatus as recited in claim 1 wherein said means for moving said screen means moves it in said first direction and in a second direction opposite said first direction, so that in the first direction said screen means moves at a speed comparable to the speed of flow of suspension in the first direction, and at a second speed, much greater than the first speed, in the second direction.

8. Apparatus as recited in claim 1 wherein said baffle means comprises a body having the shape of a paraboloid of revolution, fastened at the largest diameter portion thereof to said screen surface.

9. Apparatus as recited in claim 8 wherein said baffle body has an interior in open communication with said screen cavity volume.

10. Apparatus as recited in claim 1, or 4 wherein said baffle means comprises a generally conically-shaped body tapering inwardly in said first direction, and stationary with respect to said container.

11. Apparatus as recited in claim 2 comprising a plurality of openings formed in said substantially conical baffle means, providing communication between said screen cavity volume and said extracted liquid outlet.

12. Apparatus as recited in claim 2 further comprising a plurality of sets of a plurality of openings providing communication between said screen cavity volume and the interior of said substantially conical baffle means, and at least one interior partition formed within said substantially conical baffle means, dividing the interior thereof into at least two liquid chambers, each liquid chamber having a set of said plurality of openings associated therewith.

13. Apparatus as recited in claim 2 or 1 further comprising rotating scraper means positioned adjacent said suspension outlet for facilitating movement of suspension from said container.

14. Apparatus as recited in claim 1, 3, or 4 further comprising means for introducing treatment liquid into the container, from an interior sidewall thereof, at at least one position along the inward taper of said screen surface, so that during liquid extraction with said screen surface a crosswise flow of treatment liquid is obtained through substantially all suspension flowing through said container.

15. Apparatus as recited in claim 14 wherein said treatment liquid introducing means comprises, at each position along said container, an annular baffle plate means for introducing the treatment liquid so that it initially has a velocity component in said first direction, and is introduced substantially evenly around the circumference of said container.

16. Apparatus as recited in claim 2 or 1 wherein said container dimension of elongation is vertical, and wherein said container inlet is disposed above said container outlet.

17. Apparatus as recited in claim 1 wherein said screen means comprises a generally toroidal screen body, having an annular cross-section.

18. Apparatus for continuously extracting liquid from a flowing suspension, comprising
an elongated container through which suspension to be treated flows in a first direction substantially coextensive with the dimension of elongation of said container, said container having an inlet and an outlet adjacent opposite ends of said container in the dimension of elongation thereof;
screen means for removal of a portion of the liquid from the suspension flowing through said container, said screen means including a screen surface defining a screen cavity volume therewithin, the screen cavity volume tapering in said first direction so that the cross-section of suspension flow channel expands towards said container outlet;
baffle means disposed within said screen cavity volume and comprising a generally conically-shaped body tapering inwardly in said first direction, and stationary with respect to said container;
an outlet from said screen cavity volume to an area remote from said container;
bearing means for mounting said screen means for movement generally in the dimension of elongation of said container; and
means for moving said screen means generally in the dimension of elongation of said container.

19. Apparatus for continuously extracting liquid from a flowing suspension, comprising
an elongated container through which suspension to be treated flows in a first direction substantially coextensive with the dimension of elongation of said container, said container having an inlet and an outlet adjacent opposite ends of said container in the dimension of elongation thereof;
screen means for removal of a portion of the liquid from the suspension flowing through said container, said screen means including a screen surface defining a screen cavity volume therewithin, the screen cavity volume tapering in said first direction so that the cross-section of suspension flow channel expands towards said container outlet;
baffle means disposed within said screen cavity volume;
an outlet from said screen cavity volume to an area remote from said container;
bearing means for mounting said screen means for movement generally in the dimension of elongation of said container;
means for moving said screen means generally in the dimension of elongation of said container; and
means for introducing treatment liquid into the container, from an interior sidewall thereof, at at least one position along the inward taper of said screen surface, so that during liquid extraction with said screen surface a crosswise flow of treatment liquid is obtained through substantially all suspension flowing through said container.

20. Apparatus as recited in claim 19 wherein said treatment liquid introducing means comprises, at each position along said container, an annular baffle plate means for introducing the treatment liquid so that it initially has a velocity component in said first direction, and is introduced substantially evenly around the circumference of said container.

* * * * *